(12) United States Patent
Hagiwara (10) Patent No.: US 9,176,526 B2
(45) Date of Patent: Nov. 3, 2015

(54) PORTABLE TERMINAL DEVICE, IMAGE DISPLAY METHOD USED FOR SAME, AND RECORDING MEDIUM TO RECORD PROGRAM FOR SAME

(75) Inventor: Hiroshi Hagiwara, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1185 days.

(21) Appl. No.: 13/119,046

(22) PCT Filed: Sep. 15, 2009

(86) PCT No.: PCT/JP2009/066580
§ 371 (c)(1),
(2), (4) Date: Mar. 15, 2011

(87) PCT Pub. No.: WO2010/038653
PCT Pub. Date: Apr. 8, 2010

(65) Prior Publication Data
US 2011/0169865 A1    Jul. 14, 2011

(30) Foreign Application Priority Data

Oct. 1, 2008    (JP) ................................. 2008-255876

(51) Int. Cl.
*G06F 1/16*   (2006.01)
*G06F 3/0346*   (2013.01)
*H04M 1/725*   (2006.01)

(52) U.S. Cl.
CPC ............. *G06F 1/162* (2013.01); *G06F 3/0346* (2013.01); *G06F 2200/1614* (2013.01); *H04M 1/72519* (2013.01); *H04M 2250/22* (2013.01)

(58) Field of Classification Search
CPC ... G06F 3/0346; G06F 3/0481; G06F 3/0482; G06F 1/1616–1/1624; G06F 1/1626
USPC .................. 715/864, 746, 243, 718
See application file for complete search history.

(56) References Cited

U.S. PATENT DOCUMENTS

| | | | |
|---|---|---|---|
| 7,802,206 B1* | 9/2010 | Davis et al. | 715/864 |
| 2007/0123325 A1* | 5/2007 | Kim et al. | 455/575.3 |
| 2010/0050114 A1* | 2/2010 | Braun et al. | 715/788 |

FOREIGN PATENT DOCUMENTS

| | | |
|---|---|---|
| JP | 2002135380 A | 5/2002 |
| JP | 2003174495 A | 6/2003 |
| JP | 2004336495 A | 11/2004 |
| JP | 2006211690 A | 8/2006 |
| JP | 2008171129 A | 7/2008 |
| JP | 2008217704 A | 9/2008 |
| WO | 2006009001 A | 1/2006 |

OTHER PUBLICATIONS

FOMA SH906i Instruction manual, NTT DoCoMo, Sep. 2008, Internet <http://www.nttdocomo.co.jp/binary/pdf/support/trouble/manual/download/sh906i/SH906i_J_All.pdf>.

* cited by examiner

*Primary Examiner* — Amy Ng
*Assistant Examiner* — Roland Casillas (57) ABSTRACT

Provided are a portable terminal device, an image display method used for same and a recording medium to record a program for same that enable display of images suitable for various forms of use, such as when the screen orientation or input operation is changed, and display of information pertaining to the images. The portable terminal device can make changes for multiple forms of use and has detection means for detecting a change in the form of use, and changing means for changing the method to be used to display image-related information on a display screen according to the detection result by the detection means.

8 Claims, 9 Drawing Sheets

MODE 1: TOUCH STYLE

FIG. 4A

MODE 3: LENGTHWISE STYLE

FIG. 4C

MODE 2: CROSSWISE STYLE

PORTABLE TERMINAL DEVICE, IMAGE DISPLAY METHOD USED FOR SAME, AND RECORDING MEDIUM TO RECORD PROGRAM FOR SAME

This application is the National Phase of PCT/JP2009/066580, filed Sep. 15, 2009, which is based upon and claims the benefit of priority from Japanese patent application No. 2008-255876, filed on Oct. 1, 2008, the disclosure of which is incorporated herein in its entirety by reference.

TECHNICAL FIELD

The present invention relates to a portable terminal device, an image display method used for same, and a recording medium to record program for same. In particular, the present invention relates to a method of displaying images and information pertaining to the images for the portable terminal devices including mobile phones or the like.

BACKGROUND ART

In recent years, portable terminal devices having such as a mechanism of switching a screen to lengthwise direction or crosswise direction, and a touch panel function for performing input operation by touching directly on a screen, are becoming popular.

In the case of displaying images and information pertaining to the images, the above-mentioned portable terminal device displays only typical information such as a list of thumbnail images or a list of file names and title information assigned to the images based on setting by a user.

As the portable terminal device having the mechanism of switching the screen to lengthwise direction or crosswise direction, a device which changes direction of displayed contents in accordance with screen direction is proposed (for example, refer to the patent document 1).

In addition, an equipment which continuously displays original image data in a display after displaying a list of a plurality of acquired thumbnail image data in the display unit is disclosed (for example, refer to the patent document 2), as a portable terminal device which displays images and information pertaining to the images.

Patent document 1: Japanese Patent Application Laid-Open No. 2002-135380
Patent document 2: Japanese Patent Application Laid-Open No. 2004-336495
Patent document 3: Japanese Patent Application Laid-Open No. 2006-211690

DISCLOSURE OF THE INVENTION

Technical Problem

In the case that the portable terminal device mentioned above displays images and information pertaining to the images, it displays only a patterned information such as a list of thumbnail images or a list of file names and title information assigned to the images based on setting by a user. However, the portable terminal device mentioned above is not displaying images and information pertaining to the images suitable for a use mode such as change of screen direction or change of input operation methods.

The portable terminal device described in the above-mentioned patent document 1 disclosed only a display method corresponding to screen directions. In addition, the portable terminal device described in the patent document 2 disclosed only a display method in the case of displaying images and information pertaining to the images. However, these portable terminal devices have a problem that they do not display images and information pertaining to the images suitable for a use mode of the device.

The object of the present invention is to provide a portable terminal device which is able to settle the above-mentioned problem, and to display images and information pertaining to the images suitable for a use mode in accordance with changes such as screen direction and input operation method, a image display method used for that, and a recording medium which records a program thereof.

Technical Solution

A portable terminal device according to the present invention is adaptable to a plurality of use modes, and it comprises detecting means for detecting a change of the use mode, and changing means for changing a display method of information pertaining to an image to a display screen in accordance with a detected result of the detecting means.

An image display method according to the present invention is that a portable terminal device which is adaptable to a plurality of use modes detects a change of a use mode, and changes a display method of information pertaining to an image to a display screen in accordance with a detected result of a change of the use mode.

A recording medium according to the present invention stores a program which causes a central processing unit execute processing, the central processing unit being in a portable terminal device which is adaptable to a plurality of use modes, the processing comprising: detecting a change of a use mode; and changing a display method of information pertaining to an image to a display screen in accordance with a detected result of the change of the use mode.

Advantageous Effects

According to the present invention, a portable terminal device, an image display method used for that, and a recording medium which records the program thereof, can display images and information pertaining to the images suitable for respective use modes.

BRIEF DESCRIPTION OF THE DRAWINGS

FIG. 4 (FIGS. 4A, 4B and 4C) is a diagram showing a mode of a screen display part of the portable terminal device in FIG. 3.

FIG. 5 (FIGS. 5A, 5B and 5C) is a diagram showing a display image of respective modes in the case of displaying a list of images according to the second exemplary embodiment of the present invention.

FIG. 6 (FIGS. 6A, 6B and 6C) is a diagram showing a display image of respective modes in the case of displaying a list of information of images according to the second exemplary embodiment of the present invention.

EXPLANATION OF REFERENCE

1 portable terminal device
11 control unit
12 antenna
13 wireless radio unit
14 signal processing unit
15 speaker
16 microphone
17 voice processing unit
18 memory unit
19 numerical keypad
20 display unit
21 touch panel
22 and 22a use mode change detecting unit
101 to 103 and 201 to 203 display image
111 display method changing unit
221 upper housing rotation detecting unit
222 upper housing slide detecting unit

BEST MODE FOR CARRYING OUT THE INVENTION

Figure 11:
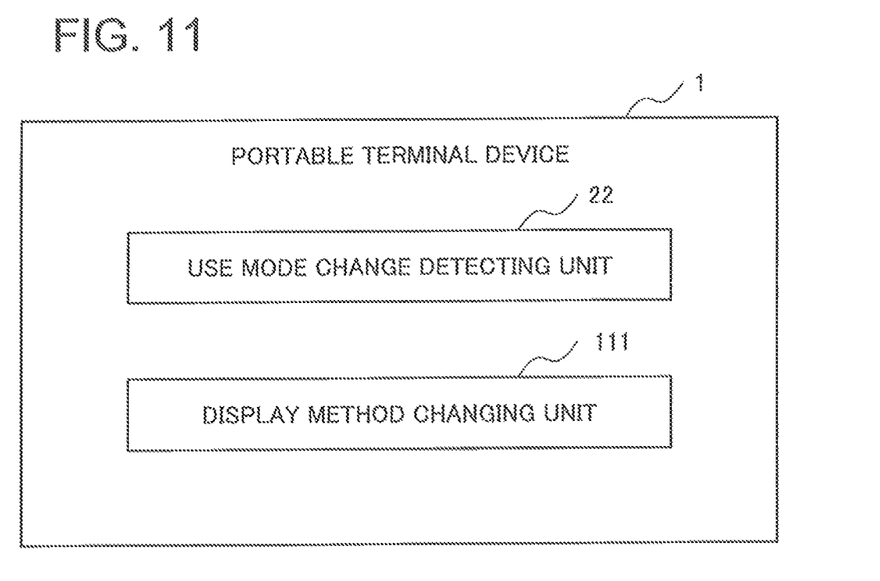
FIG. 11 is a block diagram showing an exemplary configuration of the portable terminal device according to a first exemplary embodiment of the present invention.

Then, the followings are descriptions of the exemplary embodiments of the present invention with reference to the drawings. FIG. 11 is the block diagram showing the exemplary configuration of the portable terminal device according to the first exemplary embodiment of the present invention. As shown in FIG. 11, the portable terminal device 1 includes an use mode change detecting unit 22 and a display method changing unit 111.

The portable terminal device 1 can adapt to a plurality of use modes. The use mode designates, as an example, an approach of how to arrange directions and locations of screens and housings in the portable terminal device 1. In addition, the use mode also designates, for example, what will be used for input operation of the portable terminal device 1.

The use mode change detecting unit 22 detects a change of the use mode of the portable terminal device 1. Further, the use mode change detecting unit 22 may also be denominated as the detecting means.

In accordance with the detected result of the use mode change detecting unit 22, the display method changing unit 111 changes a display method of images and information pertaining to the images of a display screen of the portable terminal device 1. Further, the display method changing unit 111 may also be denominated as the changing means.

Thus, according to the first exemplary embodiment, the portable terminal device 1 can display images and information pertaining to the images suitable for respective use modes. This is because, the display method changing unit 111 changes the display method of images and information pertaining to the images in accordance with a change of the use mode of the portable terminal device 1 which the use mode change detecting unit 22 detected.

Figure 1:
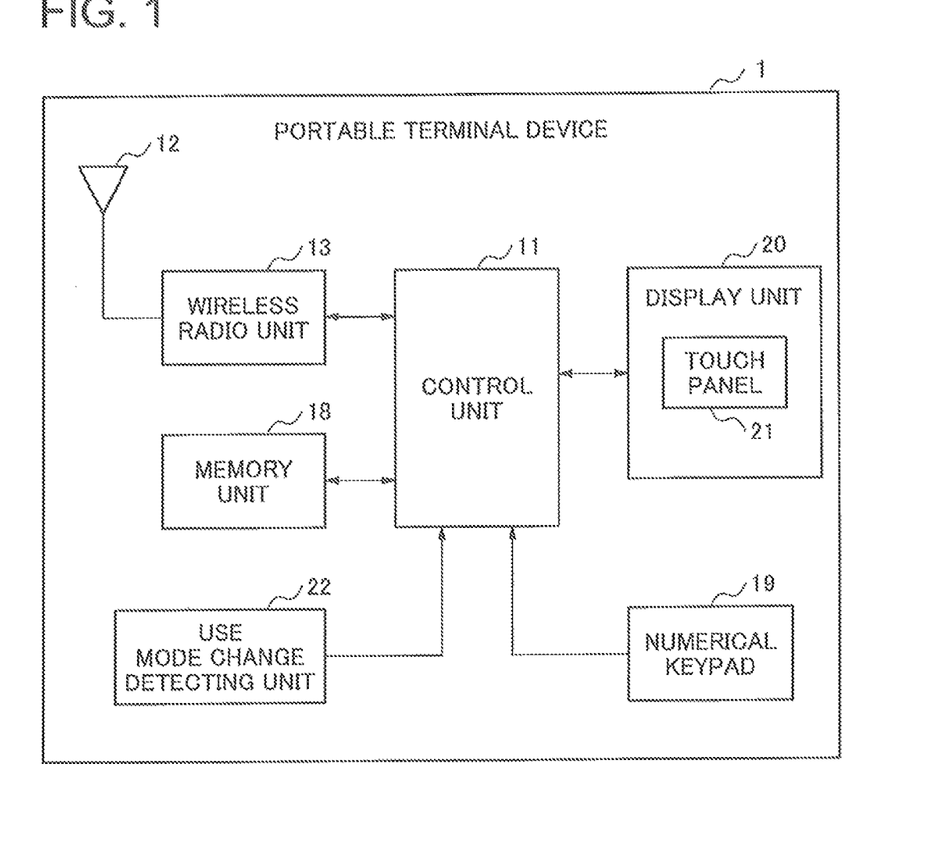
FIG. 1 is a block diagram showing an exemplary configuration of a portable terminal device according to a second exemplary embodiment of the present invention.

Next, the second exemplary embodiment of the present invention is described. FIG. 1 is the block diagram showing the exemplary configuration of the portable terminal device according to the second exemplary embodiment of the present invention. As shown in FIG. 1, the portable terminal device 1 includes a control unit 11, an antenna 12, a wireless radio unit 13, a memory unit 18, a numerical keypad 19, a display unit 20, and the use mode change detecting unit 22.

The portable terminal device 1 includes a mechanism of switching a screen of the display unit 20 to lengthwise direction or crosswise direction, and a touch panel function (touch panel 21) for performing input operation by touching directly on a screen. Here, a housing part for mounting a screen of the display unit 20 denominates an upper housing, and a housing part for mounting a key input function (numerical keypad 19) denominates a lower housing.

The control unit 11 is, for example, composed of a CPU (central processing unit), and synthetically controls the entire portable terminal device 1. The wireless radio unit 13 communicates by wireless between the embedded antenna 12 and a nearest base station (not illustrated in the diagram). The memory unit 18 stores a program which is executed by the control unit 11 and a phone directory data or the like. The numerical keypad 19 includes various keys such as numerical keys and call initiating keys. The display unit 20 outputs pictures or the like. The touch panel 21 can be operated with a finger or a touch pen or the like.

A mechanism of switching a screen to lengthwise direction or crosswise direction includes, for example, a mechanism including the upper housing and the lower housing and only the upper housing can be rotated freely in the case that a main display screen is arranged in the upper housing. The portable terminal device 1 according to the second exemplary embodiment of the present invention enables to change screen direction by installing the mechanism.

In addition, the portable terminal device 1 includes the touch panel function (touch panel 21) and the key input function (numerical keypad 19). Then, change of input operation is enabled for the portable terminal device 1 by switching between input operation using the touch panel function and input operation using the key input function.

Further, for the portable terminal device 1, in the case that the key input function part (numerical keypad 19) is hidden by overlapping the upper housing and the lower housing, only input operation using the touch panel function (touch panel 21) is available. In addition, in the portable terminal device 1, by exposing the key input function part (numerical keypad 19) in accordance with rotation of the upper housing, both input operation using the touch panel function (touch panel 21) and input operation using the key input function (numerical keypad 19) are available.

Figure 2:
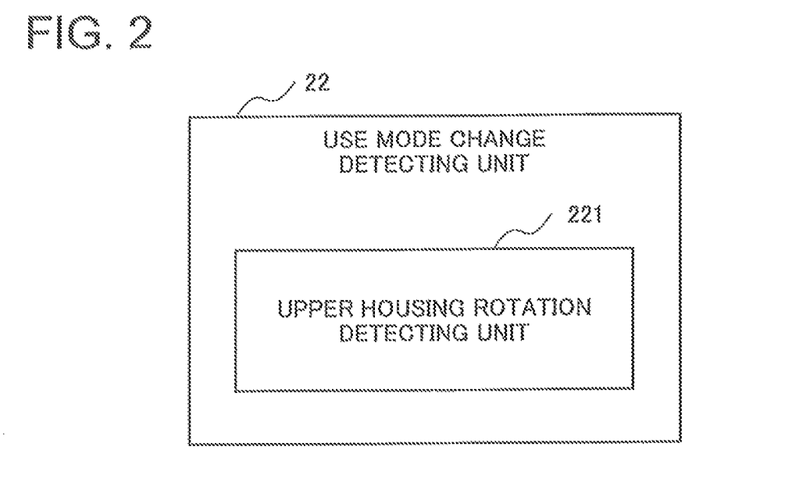
FIG. 2 is a block diagram showing an exemplary configuration of an use mode change detecting unit in FIG. 1.

FIG. 2 is the block diagram showing the exemplary configuration of the use mode change detecting unit 22 in FIG. 1. In FIG. 2, the use mode change detecting unit 22 is comprised of an upper housing rotation detecting unit 221. The upper housing rotation detecting unit 221 detects a status that lengthwise direction of the upper housing and lengthwise direction of the lower housing are orthogonally crossing in accordance with rotation of the upper housing, and a status that lengthwise direction of the upper housing is in parallel with lengthwise direction of the lower housing in accordance with further rotation of the upper housing from the status. In addition, under a status that lengthwise direction of the upper housing is in parallel with lengthwise direction of the lower housing, the upper housing rotation detecting unit 221 may detect a status that the upper housing and the lower housing overlap and a status that they don't overlap as a different status.

Further, as a change detection method of a use mode of the portable terminal device 1 by the use mode change detecting unit 22, although following methods (1) or (2) or the like are available, it may adapt any one among the methods.
(1): A method of detecting direction of the upper housing and the lower housing mechanisms.
(2): A method of detecting direction of the upper housing and the lower housing acceleration sensors (not illustrated in the diagram).

The following describes detailed examples of the method (1). The housing rotation detecting unit 221 includes a first contact point in the upper housing and a second contact point in the lower housing of the portable terminal device 1, and these points are opposing. The housing rotation detecting unit 221 determines whether or not the first contact point touches with the second contact point each other. These contact points may any one among such as electric contact points or magnetic sensors. By arranging these contact points at a position where the lower housing contacts with the upper housing in the case that the upper housing is rotated, the housing rotation detecting unit 221 detects positional relationship between the upper housing and the lower housing. That is, by arranging these contact points at a position where the upper housing touches with the lower housing at the time of a use mode of the portable terminal device 1, the use mode change detecting unit 22 detects the use mode of the portable terminal device 1. Further, number of the contact point of the first contact point and second contact point may one for each or a plural for each. In the case that number of the contact point is plural, the housing rotation detecting unit 221 may detect which contact point touches with which contact point among combination of a plurality of opposing contact points.

In the portable terminal device 1, "touch style" is denominated for a use mode wherein input operation is performed using the touch panel function (touch panel 21). In addition, "crosswise style" is denominated for a use mode wherein only the upper housing is rotated and the screen is used in a landscape status. Further, "lengthwise style" is denominated for a use mode wherein the upper housing is rotated further from the "crosswise style" and the screen is used in a longitudinal status.

In the case of "touch style" of the portable terminal device 1, a user can performs input operation using only the touch panel function (touch panel 21); however, a user cannot performs input operation using the key input function (numerical keypad 19).

In the case of "crosswise style" or "lengthwise style", the portable terminal device 1 may have both the touch panel function (touch panel 21) and the key input function (numerical keypad 19) or may have only the key input function (numerical keypad 19).

In the case that the portable terminal device 1 has both the touch panel function (touch panel 21) and the key input function (numerical keypad 19), both input operation using the touch panel function (touch panel 21) and input operation using the key input function (numerical keypad 19) are available. In addition, in the case of "crosswise style", it is possible to display two screens on a landscape screen wherein it displays respectively and separately on a right side screen and a left side screen.

The portable terminal device 1 detects a change of use mode of the portable terminal device 1 among "touch style", "crosswise style", and "lengthwise style". Then, the portable terminal device 1 automatically changes the display of images and information pertaining to the images (such as file names and title information assigned to the images) in accordance with the detected result.

For example, "touch style" is a use mode wherein input operation using the key input function (numerical keypad 19) is not available, but only input operation using the touch panel function (touch panel 21) with a finger is available. For this reason, in the case of "touch style", the portable terminal device 1 displays large icon for each image on the screen, so that a user can select easily with a finger.

In the case of "crosswise style", the portable terminal device 1 displays a list of thumbnail images on the left side screen by utilizing a feature of double display screens wherein it can display on the right side screen and on the left side screen respectively and separately. Then, the portable terminal device 1 displays on the right side screen a list of information pertaining to the images corresponding to selected image among the thumbnail images. Further, the contents displayed on the left side screen and the contents displayed on the right side screen can be exchanged each other.

In the case of "lengthwise style", the portable terminal device 1 displays more number of icons than the case of "touch style", by utilizing a feature that both input operation using the touch panel function (touch panel 21) and input operation using the key input function (numerical keypad 19) are available. In addition, the portable terminal device 1 displays icon of each image larger than the case of "crosswise style", so that a user can select easily with a finger.

On the other hand, a case of displaying a list of information pertaining to the images is described. The "touch style" is a use mode wherein input operation using the key input function (numerical keypad 19) is not available, but only input operation using the touch panel function (touch panel 21) with a finger is available. For this reason, in the case of "touch style", the portable terminal device 1 displays information pertaining to an image largely on the screen, so that a user can select easily with a finger.

In the case of "crosswise style", the portable terminal device 1 displays a list of information pertaining to the images on the left side screen by utilizing a dual display screen feature wherein it can display on the right side screen and on the left side screen respectively and separately. Then, the portable terminal device 1 displays on the right side screen an image which is selected among the list corresponding to information pertaining to the image. Further, the contents displayed on the left side screen and the contents displayed on the right side screen can be exchanged each other.

In the case of "lengthwise style", the portable terminal device 1 displays information pertaining to an image more than the case of "touch style" by utilizing a feature that both input operation using the touch panel function (touch panel 21) and input operation using the key input function (numerical keypad 19) are available. In addition, the portable terminal device 1 displays information pertaining to an image larger than the case of "crosswise style", so that a user can select easily with a finger.

Thus, concerning display of the images and information pertaining to the images, the portable terminal device according to the second exemplary embodiment of the present invention can display images and information pertaining to the images suitable for each use mode in accordance with such as screen direction and change of input operation method of the use modes.

Figure 3:
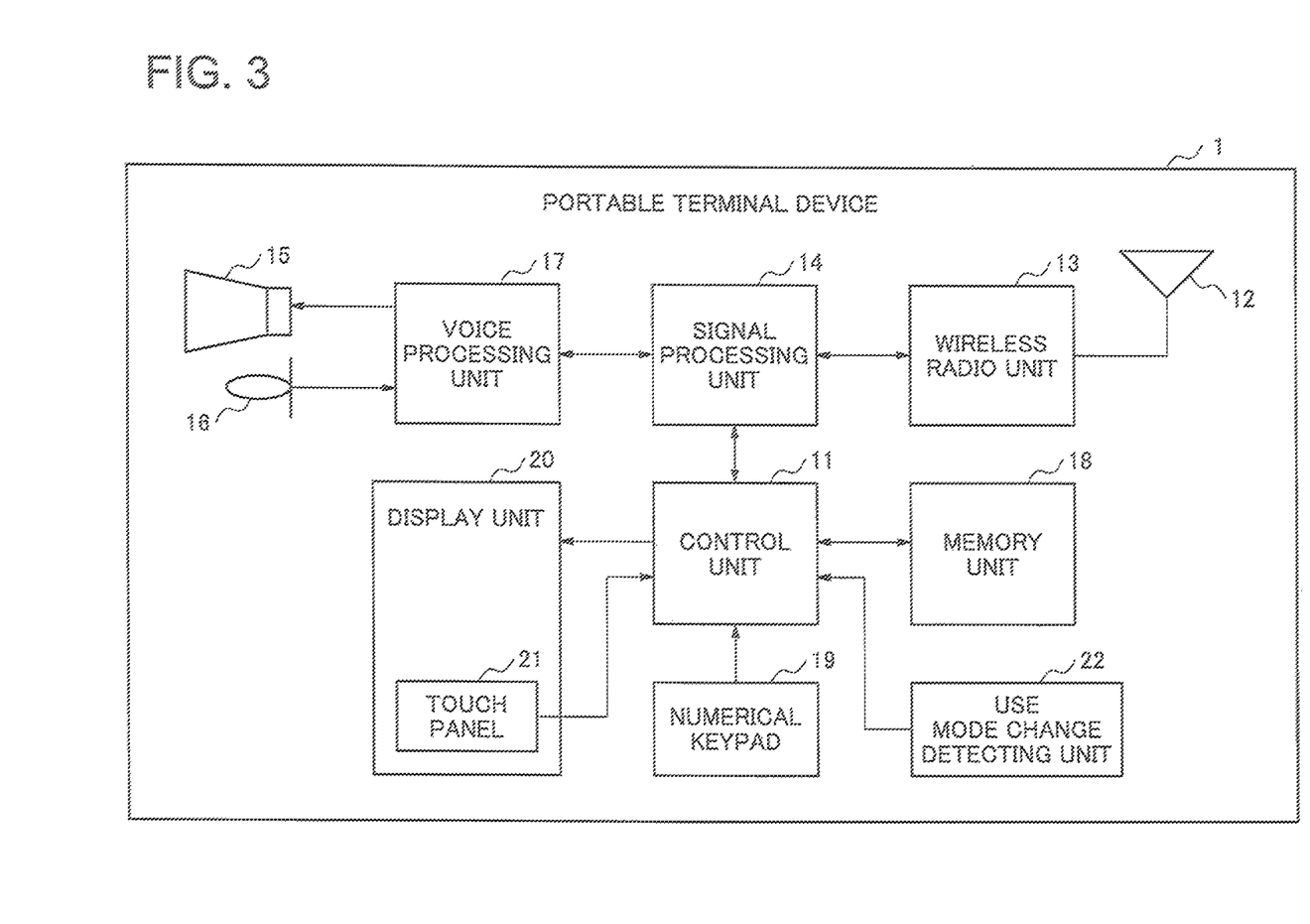
FIG. 3 is a block diagram showing an exemplary configuration of the portable terminal device according to the second exemplary embodiment of the present invention.

FIG. 3 is the block diagram showing the exemplary configuration of the portable terminal device according to the second exemplary embodiment of the present invention. As an example of the portable terminal device 1 according to the second exemplary embodiment of the present invention, FIG. 3 indicates the portable terminal device equipped with a mechanism which changes the screen to lengthwise direction or crosswise direction, and the touch panel function for performing input operation by touching directly on a screen.

As the mechanism of switching the screen to lengthwise direction or crosswise direction, for example as mentioned above, a mechanism can be considered wherein only the upper housing can be rotated freely in the case that it consists of the upper housing and the lower housing and a main display screen is arranged in the upper housing. In addition, the portable terminal device has the touch panel function and the key input function, and it enables the switching of input operation by selecting among input operation using the touch panel function and input operation using the key input function.

Further, in the above-mentioned portable terminal device, in the case that the numerical keypad part is hidden by overlapping the upper housing and the lower housing, only input operation using the touch panel function is available. Moreover, in the above-mentioned portable terminal device, because the numerical keypad part is exposed in accordance with the rotation of the upper housing, input operation using the touch panel function and input operation using the key input function are available.

In FIG. 3, the portable terminal device 1 includes the control unit 11, the antenna 12, the wireless radio unit 13, a signal processing unit 14, a speaker 15, a microphone 16, a voice processing unit 17, the memory unit 18, the numerical keypad 19, the display unit 20, and the use mode change detecting unit 22.

The control unit 11 is composed of a CPU as an example, and synthetically controls entire portable terminal device 1. The wireless radio unit 13 communicates between the embedded antenna 12 and a nearest base station (not illustrated in the diagram) by wireless.

The signal processing unit 14 processes transmission and reception signals. The speaker 15 outputs voices. The microphone 16 inputs voices. The voice processing unit 17 processes various voice signals such as signal of a received voice for supplying it to the speaker 15. In addition, the voice processing unit 17 processes a voice signal which is received from the microphone 16.

The memory unit 18 stores a program which is executed by the control unit 11 and a phone directory data or the like. The numerical keypad 19 includes various keys such as numerical keys and call initiating keys. The display unit 20 outputs pictures or the like and has the touch panel 21. The touch panel 21 can be operated by using such as a finger or a touch pen.

As the mechanism of switching the screen to lengthwise direction or crosswise direction, for example, a mechanism can be considered wherein only the upper housing can be rotated freely, in the case that it consists of the upper housing and the lower housing and a main display screen is arranged in the upper housing. The portable terminal device 1 according to the second exemplary embodiment of the present invention enables to change screen direction by installing the mechanism.

The portable terminal device 1 includes the touch panel function (touch panel 21) and the key input function (numerical keypad 19). In addition, the portable terminal device 1 can change input operation of itself by switching between input operation using the touch panel function (touch panel 21) and input operation using the key input function (numerical keypad 19).

As shown in the above-mentioned FIG. 2, the use mode change detecting unit 22 is comprised of the upper housing rotation detecting unit 221. The upper housing rotation detecting unit 221 detects a status that lengthwise direction of the upper housing and lengthwise direction of the lower housing are orthogonally crossing in accordance with rotation of the upper housing and a status that lengthwise direction of the upper housing is in parallel with lengthwise direction of the lower housing in accordance with further rotation of the upper housing from the status. In addition, under a status that lengthwise direction of the upper housing is in parallel with lengthwise direction of the lower housing, the upper housing rotation detecting unit 221 may detect a status that the upper housing and the lower housing overlap and a status that they don't overlap as a different status.

Further, as a method of change detection of a use mode of the portable terminal device 1 by the use mode change detecting unit 22, although method of the above-mentioned (1) or (2) or the like are available, it may adapt any one among the methods.

Figure 4A:
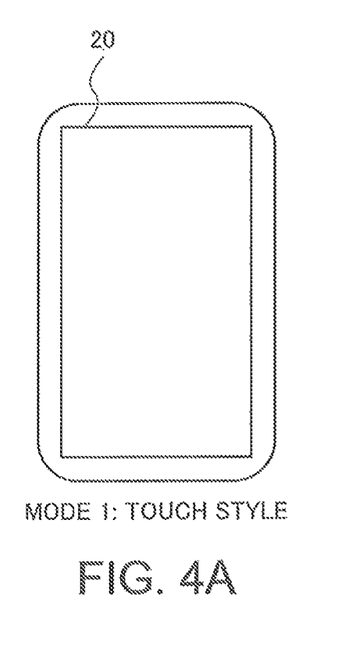
Figure 4B:
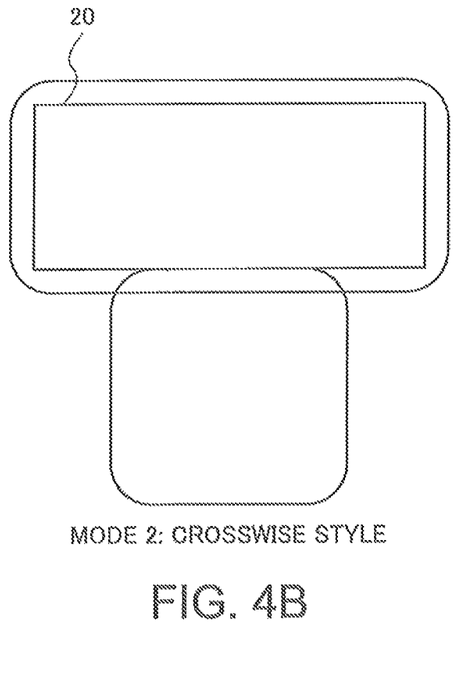
Figure 4C:
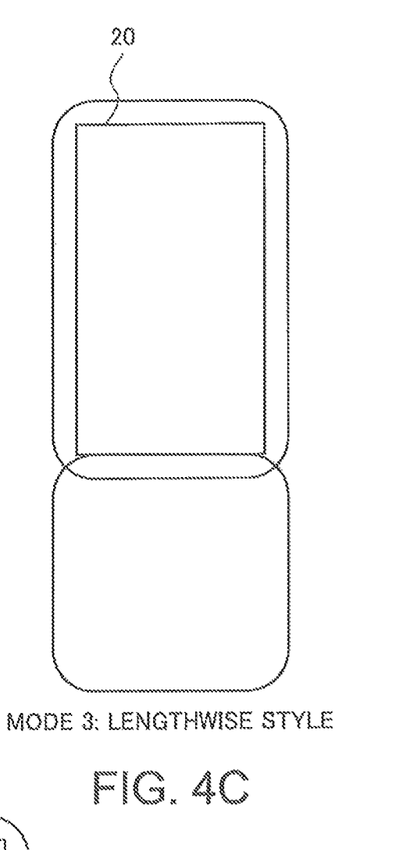

FIG. 4 (FIGS. 4A, 4B and 4C) is the diagram showing the modes of the screen display part of the portable terminal device in FIG. 3. In FIG. 4 (FIGS. 4A, 4B and 4C), the screen display part of the portable terminal device 1 has a mechanism that it can rotate to 180 degrees. FIG. 4A indicates "mode 1: touch style", FIG. 4B indicates "mode 2: crosswise style", and FIG. 4C indicates "mode 3: lengthwise style", respectively.

With regard to user operations, in "mode 1: touch style", even though only operations using the touch panel 21 are available; operations using the numerical keypad 19 are not available. In "mode 2: crosswise style" and "mode 3: lengthwise style", both operations using the touch panel 21 and operations using the numerical keypad 19 are available. In "mode 2: crosswise style", it is possible to display in dual screens.

Figure 5A:
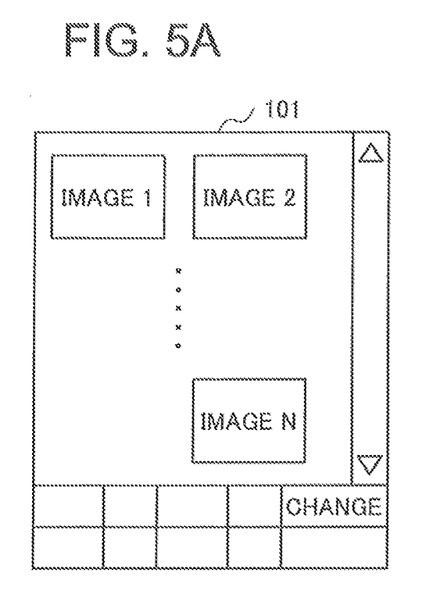
Figure 5B:
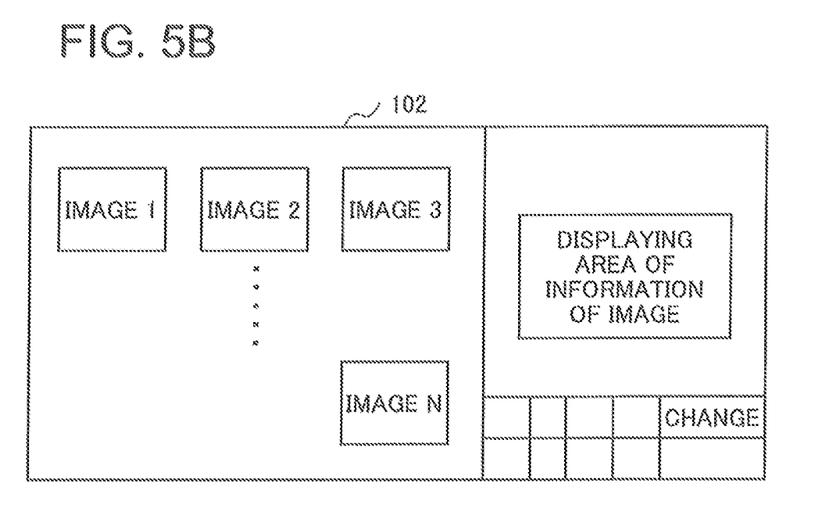
Figure 5C:
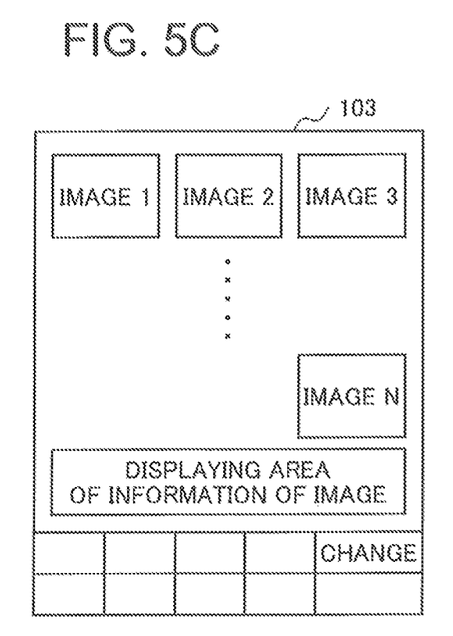

FIG. 5 (FIGS. 5A, 5B and 5C) is the diagram showing display image of respective modes in the case of displaying a list of the images according to the second exemplary embodiment of the present invention. FIG. 5A indicates a display image 101 in "mode 1" shown in FIG. 4A, FIG. 5B indicates a display image 102 in "mode 2" shown in FIG. 4B, and FIG. 5C indicates a display image 103 in "mode 3" shown in FIG. 4C.

Figure 6A:
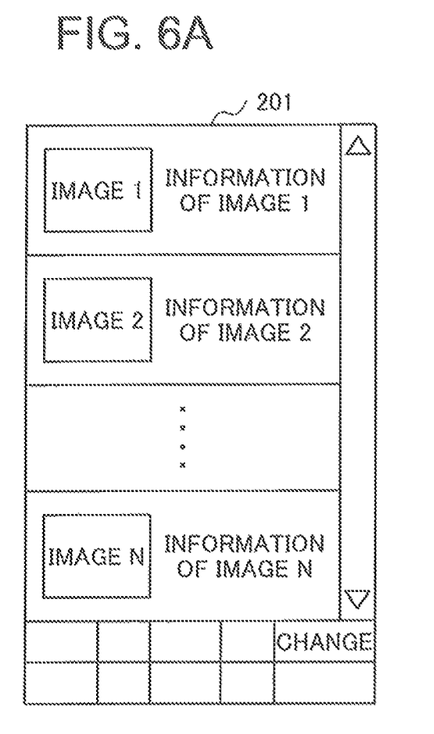
Figure 6B:
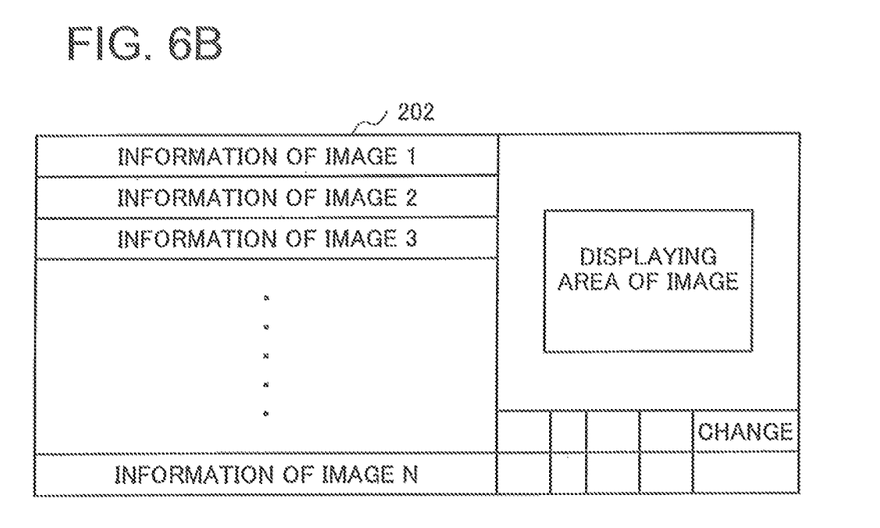
Figure 6C:
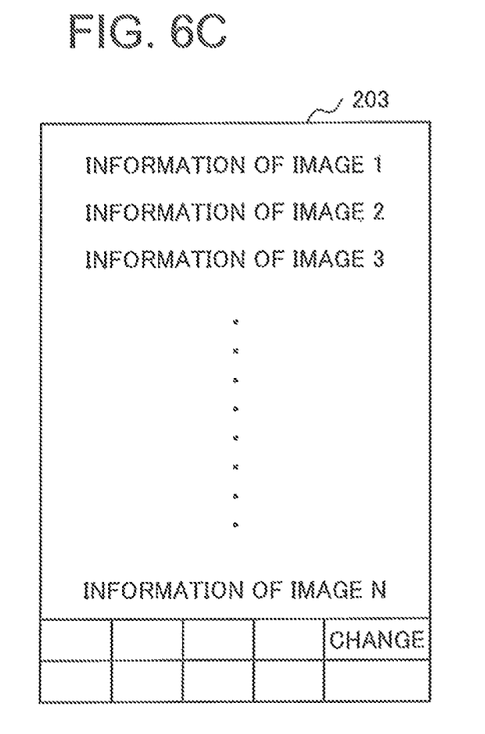

FIG. 6 (FIGS. 6A, 6B and 6C) is the diagram showing the display image of respective modes in the case of displaying a list of information of the images according to the second exemplary embodiment of the present invention. FIG. 6A indicates a display image 201 in "mode 1" shown in FIG. 4A. FIG. 6B indicates a display image 202 in "mode 2" shown in FIG. 4B. FIG. 6C indicates a display image 203 in "mode 3" shown in FIG. 4C.

Figure 7:
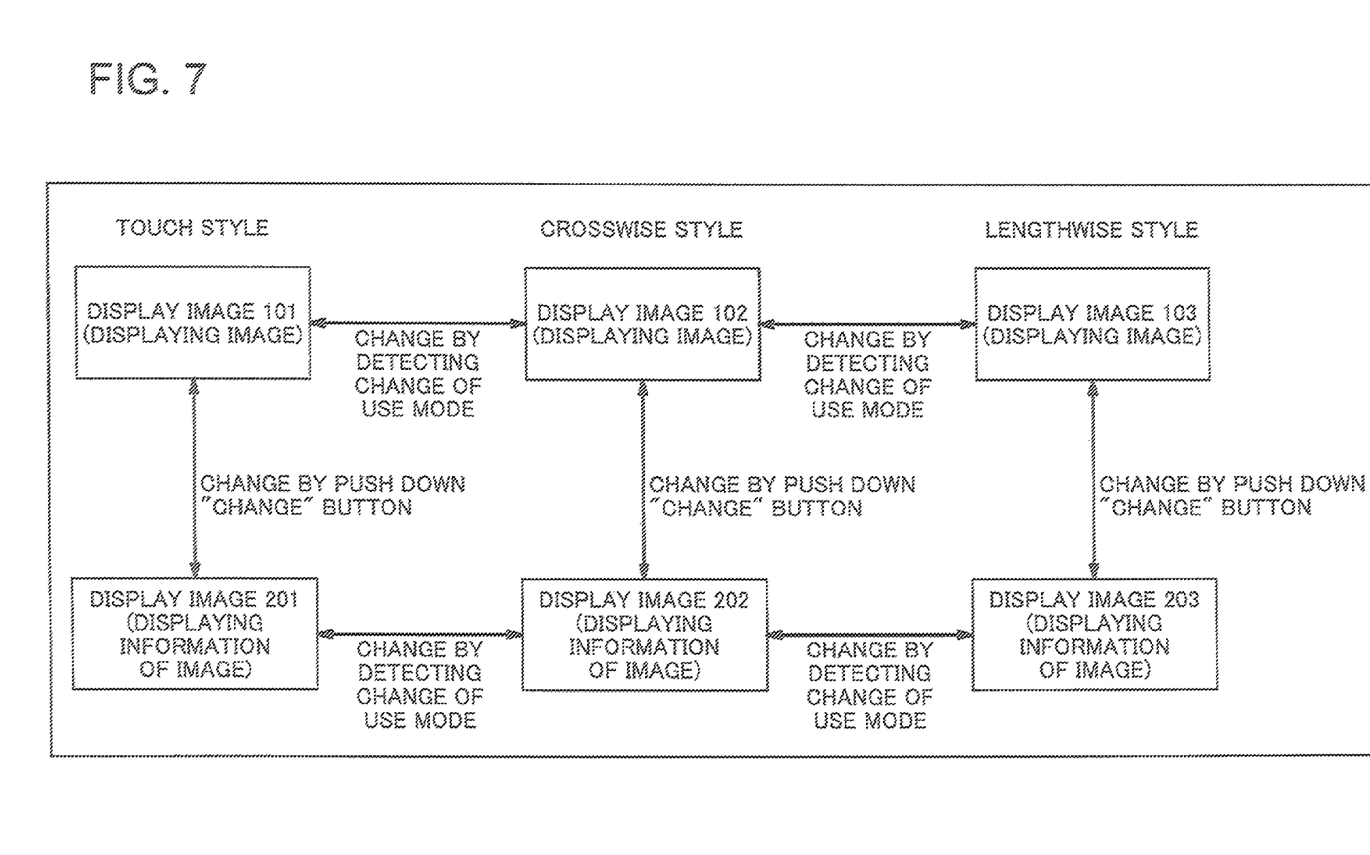
FIG. 7 is a diagram showing a relation of mode changes among respective modes 1 to 3 shown in FIG. 4 (FIGS. 4A, 4B and 4C).

FIG. 7 is the diagram showing relations of mode changes among respective modes 1 to 3 shown in FIG. 4 (FIGS. 4A, 4B and 4C). A display operation of images and information of the images in the portable terminal device 1 according to the second exemplary embodiment of the present invention is described with reference to these FIGS. 3 to 7. The portable terminal device 1 according to the second exemplary embodiment of the present invention changes a screen display automatically in accordance with mode change among "mode 1: touch style", "mode 2: crosswise style", and "mode 3: lengthwise style".

In FIG. 5 (FIGS. 5A, 5B and 5C), the display image 101 is a display in the case of a mode "mode 1: touch style". In "mode 1: touch style", since it is a mode wherein operation using the numerical keypad 19 is not allowed but operation using the touch panel 21 with a finger is only allowed, large icons of the image are arranged, so that a user may easy to select an image.

The display image 102 is a display in the case of the mode "mode 2: crosswise style". In "mode 2: crosswise style", the portable terminal device 1 displays a list of images on the left side screen utilizing the dual display screen feature. Then, the portable terminal device 1 displays a list of information of the image corresponding to the selected image on the right side screen. Further, the contents displayed on the left side screen and the contents displayed on the right side screen can be exchanged each other.

The display image 103 is a display in the case of the mode "mode 3: lengthwise style". In "mode 3: lengthwise style", the portable terminal device 1 displays more icons of the image than that of the display image 101 by utilizing a feature of the mode wherein it is possible to operate both with the numerical keypad 19 and with the touch panel 21. The portable terminal device 1 displays the icons of the image larger than that of the display image 102.

In FIG. 6 (FIGS. 6A, 6B and 6C), the display image 201 is a display in the case of the mode "mode 1: touch style". In "mode 1: touch style", since it is a mode wherein operation using the numerical keypad 19 is not allowed but operation using the touch panel 21 with a finger is only allowed, display of a list of information of the images is enlarged, so that a user may easy to select an image.

The display image 202 is a display in the case of the mode "mode 2: crosswise style". In "mode 2: crosswise style", the portable terminal device 1 displays a list of information of the images on the left side screen utilizing the dual display screen feature. Then, the portable terminal device 1 displays an image corresponding to information of the selected image on the right side screen. Further, the contents displayed on the left side screen and the contents displayed on the right side screen can be exchanged each other.

The display image 203 is a display in the case of the mode "mode 3: lengthwise style". In "mode 3: lengthwise style", the portable terminal device 1 displays more icons of information of the image than that of the display image 201 by utilizing a feature of the mode that it is possible to operate both with the numerical keypad 19 and with the touch panel 21. In addition, the portable terminal device 1 displays larger icons of information of the image than that of the display image 202.

According to the second exemplary embodiment of the present invention, as shown in FIG. 7, by pushing down a selecting button which is displayed on a screen of the modes display image 101 to 103, and 201 to 203, it is possible to mutually exchange the screen between the display image 101 and the display image 201, between the display image 102 and the display image 202, and between the display image 103 and the display image 203.

Figure 8:
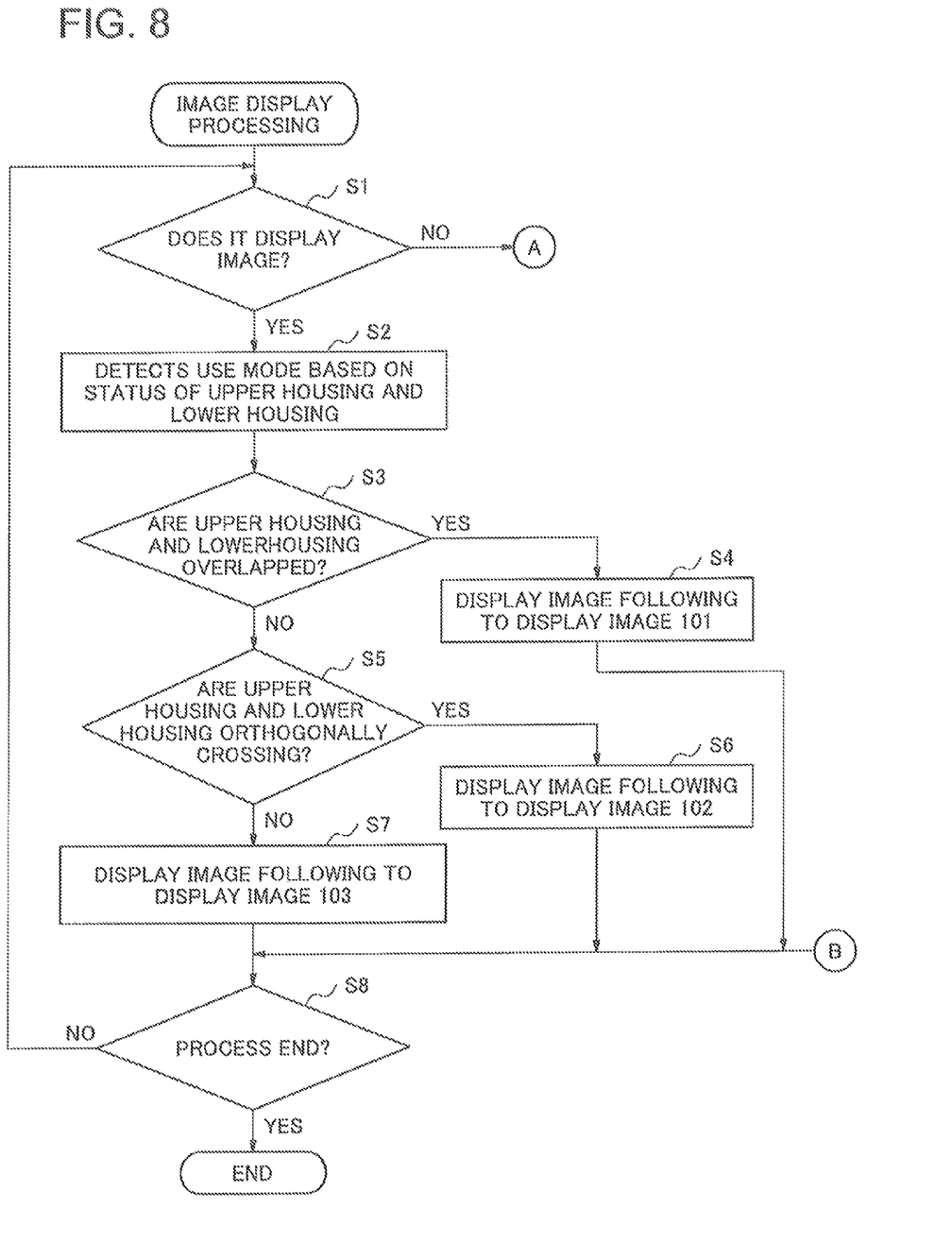
FIG. 8 is a flow chart showing a display process of images and information of the images of the portable terminal device according to the second exemplary embodiment of the present invention.
Figure 9:
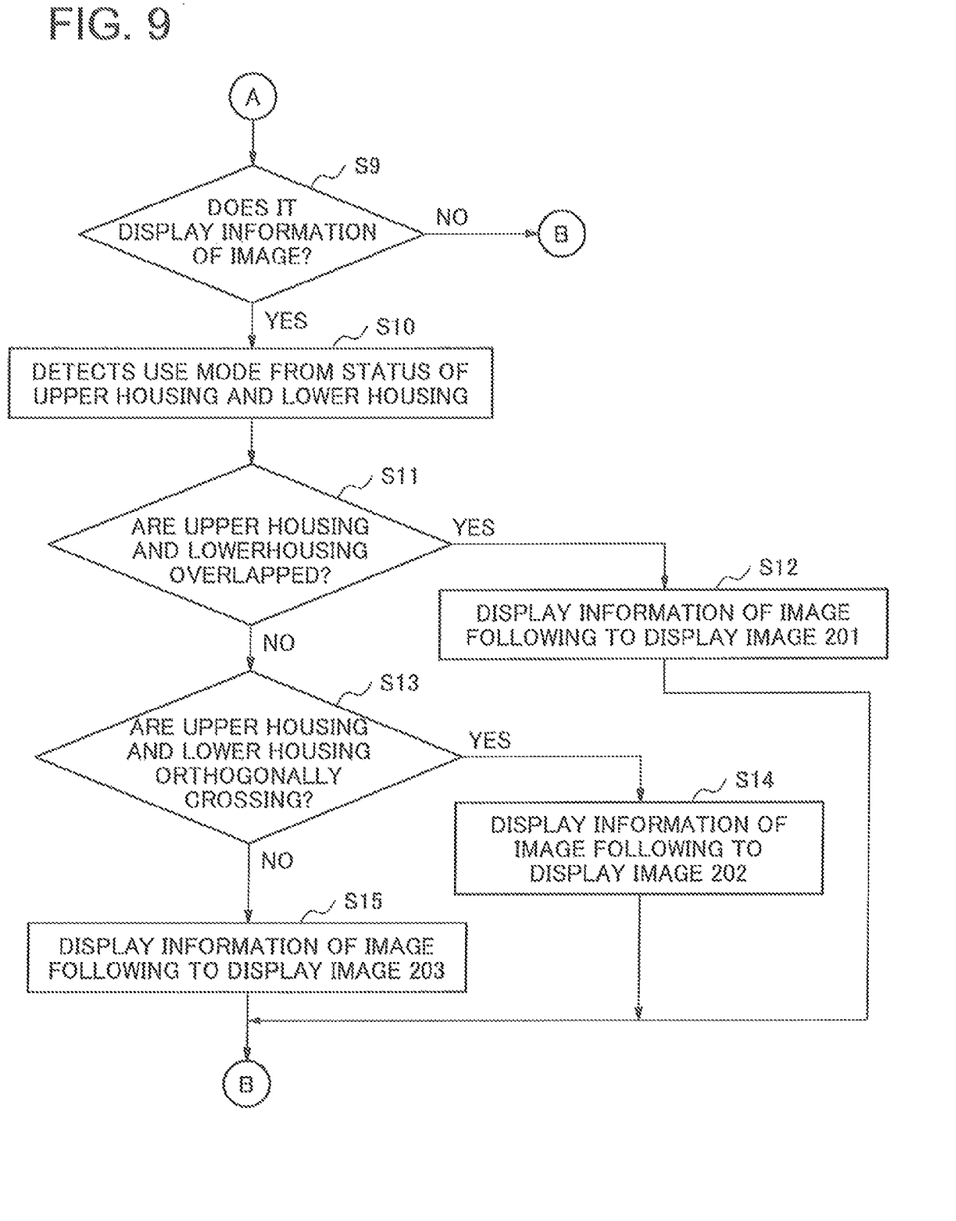
FIG. 9 is a flow chart showing a display process of images and information of the images of the portable terminal device according to the second exemplary embodiment of the present invention.

FIG. 8 and FIG. 9 are the flow charts showing a display process of the images and information of the images of the portable terminal device according to the second exemplary embodiment of the present invention. By refereeing to these FIGS. 3 to 9, a display process of the images and information of the images of the portable terminal device 1 according to the second exemplary embodiment of the present invention is described. Further, the processes shown in FIG. 8 and FIG. 9 are achieved by executing programs stored in the memory unit 18 by the control unit 11.

In the case of executing the image display process, the control unit 11 of the portable terminal device 1 determines at first whether or not to display the images (step S1 in FIG. 8). In the case that the control unit 11 determines to display the images, the use mode change detecting unit 22 detects a use mode based on status of the upper housing and the lower housing (step S2 in FIG. 8).

In the case that the use mode change detecting unit 22 detects that the upper housing and the lower housing overlap (step S3 in FIG. 8), the control unit 11 displays the images following to the display image 101 shown in FIG. 5A (step S4 in FIG. 8).

In the case that the use mode change detecting unit 22 detects that the upper housing and the lower housing don't overlap and lengthwise direction of the upper housing and lengthwise direction of the lower housing are orthogonally crossing (step S5 in FIG. 8), the control unit 11 displays the images following to the display image 102 shown in FIG. 5B (step S6 in FIG. 8).

In the case that the use mode change detecting unit 22 detects that the upper housing and the lower housing don't overlap and lengthwise direction of the upper housing is in parallel with lengthwise direction of the lower housing (step S5 in FIG. 8), the control unit 11 displays the images following to the display image 103 shown in FIG. 5C (step S7 in FIG. 8).

On the other hand, in the case that the control unit 11 determines not to display the images but to display information of the images (step S9 in FIG. 9), then the use mode change detecting unit 22 detects a use mode from a status of the upper housing and the lower housing (step S10 in FIG. 9).

In the case that the use mode change detecting unit 22 detects that the upper housing and the lower housing overlap (step S11 in FIG. 9), the control unit 11 displays the images following to the display image 201 shown in FIG. 6A (step S12 in FIG. 9).

In the case that the use mode change detecting unit 22 detects that the upper housing and the lower housing don't overlap and lengthwise direction of the upper housing and lengthwise direction of the lower housing are orthogonally crossing (step S13 in FIG. 9), then the control unit 11 displays the images following to the display image 202 shown in FIG. 6B (step S14 in FIG. 9).

In the case that the use mode change detecting unit 22 detects that the upper housing and the lower housing don't overlap and lengthwise direction of the upper housing is in parallel with lengthwise direction of the lower housing (step S13 in FIG. 9), then the control unit 11 displays the images following to the display image 103 shown in FIG. 6C (step S15 in FIG. 9).

The control unit 11 repeatedly executes the above-mentioned processes (processes of steps S1 to S7 in FIG. 8, and steps S9 to S15 in FIG. 9) until the processes reach to an end (i.e. status such as power is turned off or there is no input within a prefixed time) (step S8 in FIG. 8).

Accordingly, according to the second exemplary embodiment of the present invention, as shown in FIG. 4 (FIGS. 4A, 4B and 4C), for the portable terminal device 1 which is adaptable to a plurality of use modes, there is a merit that change of a list display of images in accordance with change of the use mode (mode 1 to mode 3) is enabled.

In addition, according to the second exemplary embodiment of the present invention, as shown in FIG. 4 (FIGS. 4A, 4B and 4C), in the portable terminal device 1 which is adaptable to a plurality of use modes, there is a merit that change of a list display of information of the images in accordance with change of the use mode is enabled.

Next, the third exemplary embodiment of the present invention is described. The basic structure of the portable terminal device according to the third exemplary embodiment of the present invention has almost the same configuration as the portable terminal device 1 according to the second exemplary embodiment of the present invention shown in FIG. 3. In addition, as a mechanism of switching a screen to lengthwise direction or crosswise direction, the portable terminal device according to the third exemplary embodiment of the present invention adapts a mechanism of sliding the upper housing in parallel with lengthwise direction of the screen from the lower housing in addition that only the upper housing can be rotated freely, in the case that it includes the upper housing and the lower housing and a main display screen is arranged in the upper housing.

Figure 10:
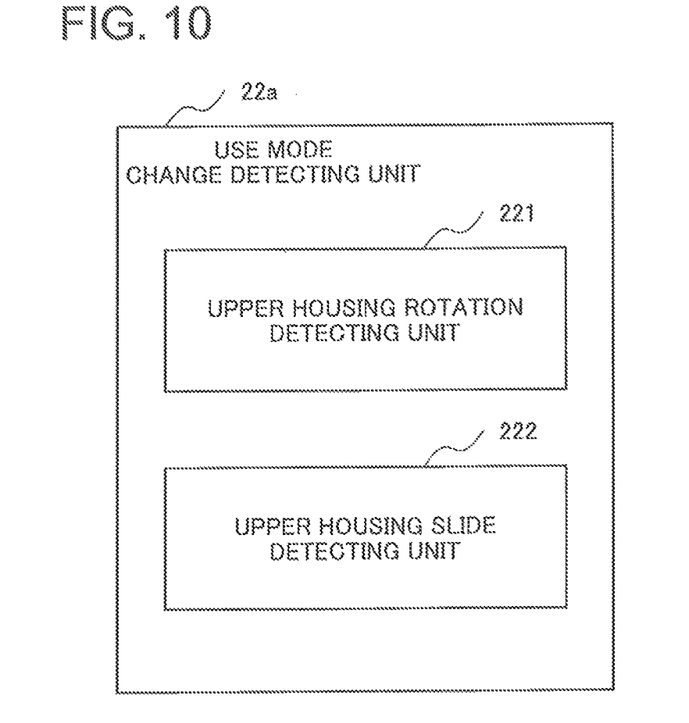
FIG. 10 is a block diagram showing an exemplary configuration of the use mode change detecting unit according to a third exemplary embodiment of the present invention.

FIG. 10 is the block diagram showing the exemplary configuration of the use mode change detecting unit according to the third exemplary embodiment of the present invention. In FIG. 10, the use mode change detecting unit 22a according to the third exemplary embodiment of the present invention is comprised of the upper housing slide detecting unit 222 in addition to the upper housing rotation detecting unit 221.

The upper housing slide detecting unit 222 detects a change from a status that the upper housing and the lower housing overlap to a status that the upper housing slides in parallel with lengthwise direction of the screen to the lower housing. Further, as a change detection of a use mode of the portable terminal device by the use mode change detecting unit 22a, any method among the above-mentioned methods (1) or (2) or the like may be used.

According to the third exemplary embodiment of the present invention, operations of the use modes are almost the same as the above-mentioned second exemplary embodiment of the present invention except for including a mode used in a status that the upper housing slides in parallel with lengthwise direction of the screen from the lower housing, and there is a similar merit as the second exemplary embodiment of the present invention.

Further, in the portable terminal device according to the exemplary embodiment of the present invention, it could be considered that displays of images and information of the images does not follow the displays shown in FIG. 5 (FIGS. 5A, 5B and 5C) and FIG. 6 (FIGS. 6A, 6B and 6C). For example, the portable terminal device according to the exemplary embodiment of the present invention can display the display image 101 at "mode 1: touch style", the display image 202 at "mode 2: crosswise style", and the display image 103 at "mode 3: lengthwise style", according to a setting by a user.

Further, for the portable terminal device according to the exemplary embodiment of the present invention, it may be considered that mode changes of the use mode is not follow the mode changes shown in FIG. 7. For example, for the portable terminal device according to the exemplary embodiment of the present invention, the use mode may directly shift from "mode 1: touch style" to "mode 3: lengthwise style" without going through "mode 2: crosswise style".

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

As mentioned above, the present invention can apply to terminal apparatuses including a mobile phone, a smart phone, a PDA (Personal Digital Assistant), and a mobile music player, which has at least a mechanism of switching the screen to lengthwise direction and crosswise direction and a touch panel function for performing input operation by touching directly on a screen.

The invention claimed is:

1. A portable terminal device, adaptable to a plurality of use modes, comprising:
    a detector configured to detect a change of the use mode;
    a changing unit that changes a display method of instruction pertaining to an image to a display screen in accordance with a detected result of said detector;
    a switching mechanism that switches the display screen to a longitudinal status or a landscape status;
    a touch panel unit that performs an input operation by touching directly on the display screen;
    a key input unit that performs a key input operation, wherein said detector detects a change of the use mode based on a status change of an upper housing which mounts the display screen; wherein
    in a case of a first use mode wherein only operation using said touch panel unit is allowed, the portable terminal device displays a larger icon of each image to the display screen than that of the longitudinal or the landscape status of the display screen, and
    in a case of a second use mode wherein the display screen is in the landscape status and operation using at least one key is allowed, the portable terminal device displays a list of thumbnail images to a left side screen and a list of information of the image corresponding to the selected image among the thumbnail images to a right side screen, and
    in a case of a third use mode wherein the display screen is in the longitudinal status and operation using at least one key is allowed, the portable terminal device displays a greater number of icons than the case of the first use mode and a larger size of icons than the case of the second use mode.

2. The portable terminal device according to claim 1, wherein
    the display method of information pertaining to an image is a list display method of information of a plurality of the images to the display screen.

3. The portable terminal device according to claim 1, wherein
    the display method of information pertaining to an image is a display method of information of a plurality of the images to the display screen.

4. The portable terminal device according to claim 1, wherein:
    in a case of the first use mode, an input operation is performed only by said touch panel unit, and
    in a case of the second and the third use mode, an input operation is performed by both said touch panel unit and the key input unit.

5. An image display method, comprising:
    detecting, by a portable terminal device which is adaptable to a plurality of use modes, a change of the use mode;
    changing, by the portable terminal device, a display method of information pertaining to an image to a display screen in accordance with the detected result of the change of the use mode;

detecting a change of the use mode based on a status change of an upper housing which mounts the display screen, wherein the portable terminal device includes:

a switching mechanism that switches that display screen to a longitudinal status or a landscape status;

a touch panel unit that performs an input operation by touching directly on the display screen;

a key input unit that performs a key input operation;

in a case of a first use mode wherein only operation using said touch panel unit is allowed, displaying a larger icon of each image to the display screen than that of the longitudinal status of landscape status of the display screen;

in a case of a second use mode wherein the display screen is in the landscape status and operation using at least one key is allowed, displaying a list of thumbnail images to a left side screen and a list of information of the image corresponding to selected image among the thumbnail images to a right side screen; and in a case of a third use mode wherein the display screen is in the longitudinal status and operation using at least one key is allowed, displaying a greater number of icons than the case of the first use mode and a larger size of icons than the case of the second use mode.

6. The image display method according to claim 5, wherein the display method of information pertaining to an image is a display method of a thumbnail image to the display screen.

7. The image display method according to claim 5, wherein the display method of information pertaining to an image is a list display method of information of a plurality of the images to the display screen.

8. A non-transitory computer readable storage medium storing a program which causes a central processing unit execute processing, the central processing unit being in a portable terminal device which is adaptable to a plurality of use modes, the processing comprising:

detecting a change of the use mode;

changing a display method of information pertaining to an image to a display screen with a detected result of the change of the use mode;

detecting a change of the use mode based on a status change of an upper housing which mounts the display screen wherein the portable terminal device includes:

a switching mechanism that switches that display screen to a longitudinal status or a landscape status; a touch panel unit that performs an input operation by touching directly on the display screen;

a key input unit that performs a key input operation;

in a case of a first use mode wherein only operation using said touch panel unit is allowed, displaying a larger icon of each image to the display screen than that of the longitudinal status of landscape status of the display screen;

in a case of a second use mode wherein the display screen is in the landscape status and operation using at least one key is allowed, displaying a list of thumbnail images to a left side screen and a list of information of the image corresponding to selected image among the thumbnail images to a right side screen; and in a case of a third use mode wherein the display screen is in the longitudinal status and operation using at least one key is allowed, displaying a greater number of icons than the case of the first use mode and a larger size of icons than the case of the second use mode.

\* \* \* \* \*